United States Patent [19]
Karpal

[11] 3,798,073
[45] Mar. 19, 1974

[54] SUBMERSIBLE BATTERY VENT PLUG
[75] Inventor: David L. Karpal, Pomona, Calif.
[73] Assignee: Teledyne, Inc., Los Angeles, Calif.
[22] Filed: Oct. 10, 1972
[21] Appl. No.: 295,912

[52] U.S. Cl............................ 136/178, 137/516.29
[51] Int. Cl. ........................................... H01m 1/06
[58] Field of Search .. 136/178; 137/516.25, 516.27, 137/516.29

[56] References Cited
UNITED STATES PATENTS
2,690,466  9/1954  Kendall et al...................... 136/178
2,690,467  9/1954  Kendall.............................. 136/178
2,558,654  6/1951  Kendall et al...................... 136/178

Primary Examiner—Donald L. Walton
Attorney, Agent, or Firm—Ronald W. Reagin

[57] ABSTRACT

A submersible battery vent plug is disclosed which includes a valve with a double seal, the first seal being adapted to close under an initial fluid pressure and the second seal adapted to close under a pressure higher than the initial pressure.

5 Claims, 1 Drawing Figure

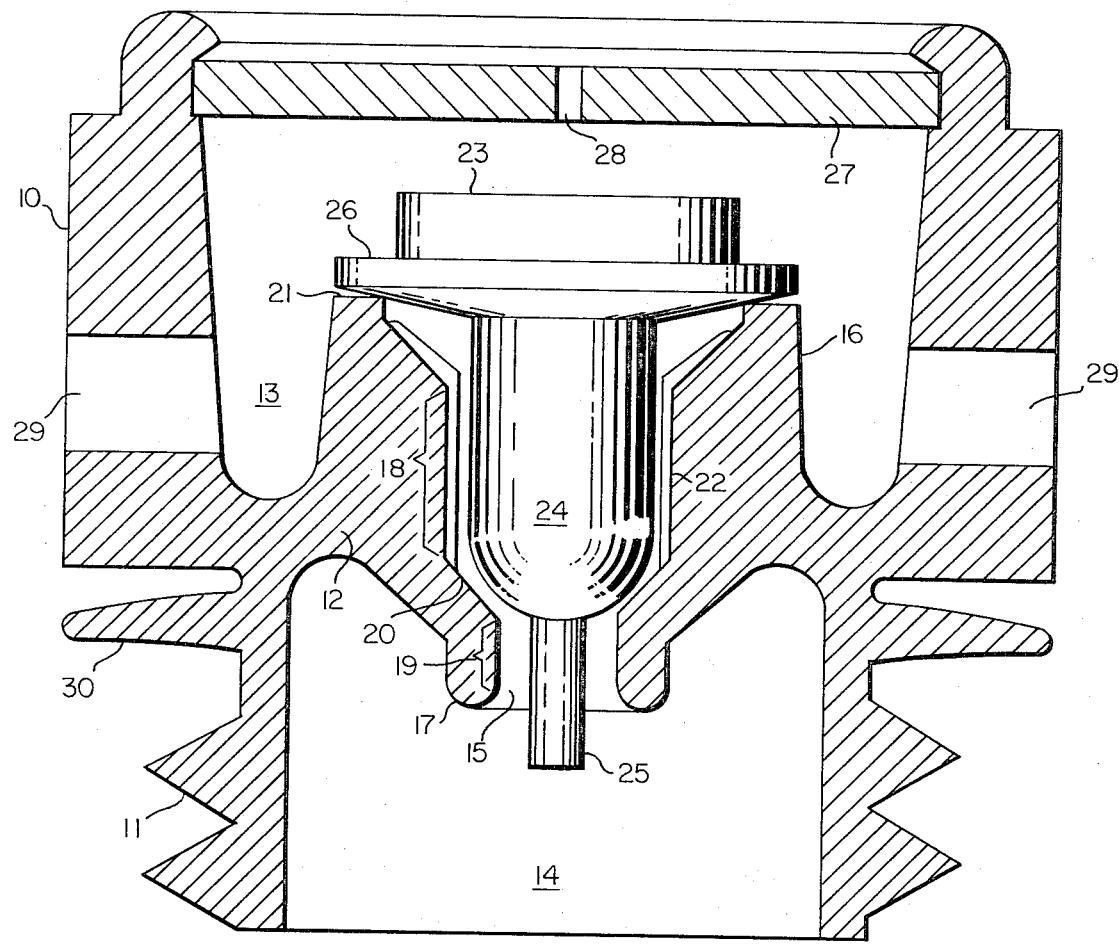

SUBMERSIBLE BATTERY VENT PLUG

BACKGROUND OF THE INVENTION

Storage batteries, such as the familiar lead-acid battery, sometimes have applications in which they are submerged in fresh or sea water for short or moderate lengths of time. Amphibious vehicles, particularly of the military type, may be used in ways which cause the accompanying batteries to be submerged under several feet of water for varying amounts of time. Batteries exposed to underwater environments must be protected against contamination of their electrolyte by the external fluid medium. In addition, it is necessary to provide means for releasing the gas — typically hydrogen-generated during the charging cycle while the battery is submerged, while minimizing the loss of electrolyte which may tend to be carried by the escaping gas or which may be sloshed about as the battery is jolted by the vehicle on which it is carried.

A submersible battery vent plug generally includes a quick acting valve adapted to close under the influence of external fluid pressure. In order to assure quick action and positive sealing, valves of the heretofore preferred type have been provided with a valve stem of relatively large surface area exposed to the fluid pressure and a sealing surface of somewhat smaller area at the edge or on the underside of the exposed surface. When fluid pressure acts on the exposed surface, the sealing surface is pressed against a valve seat to effect a seal against the external medium. As either the valve stem or the valve seat, or both, is typically made of a non-electrolytic and somewhat resilient material such as a plastic, they may be subject to a certain amount of deformation under the pressure of the fluid in which the battery is immersed. It is such deformations, as well as slight imperfections in the sealing surfaces, which cause the ordinary vent cap valve to leak small amounts of fluid at a rate which tends to increase with the external pressure.

The present invention provides a submersible battery vent cap having a valve which seals almost immediately under the influence of a relatively low external fluid pressure and which retains its sealing effectiveness or actually becomes more effective under increasing pressures.

SUMMARY OF THE INVENTION

A submersible battery vent plug in accordance with the invention includes a valve having a double seal, one of which seals promptly when the valve is subjected to a low external fluid pressure and the other of which seals at higher pressures. The first seal responds quickly to block the passage of water when the battery is first submerged. Under increasing pressure, however, the first seal may leak slightly. The amount of water allowed to pass during a brief submergence will almost certainly be small, but may become significant if the submergence continues. For this reason, the valve included in the invention has a second seal which becomes effective at pressures higher than that which causes the first seal to close. Water which does leak past the first seal must also penetrate the second before entering the battery. The combined effect of the two seals is to provide a very effective barrier against contamination of the electrolyte by the external fluid medium.

BRIEF DESCRIPTION OF THE INVENTION

The drawing depicts, in cross-section, a submersible battery vent plug embodying a double-sealing valve and other features of the invention.

DESCRIPTION OF THE PREFERRED EMBODIMENT

The submersible battery vent plug shown in the drawing comprises a tubular body 10 with an externally threaded lower portion 11 adapted to screw into a corresponding threaded opening in the cover of a storage battery. The interior of body 10 is divided into two chambers by an interior wall 12. Upper chamber 13 and lower chamber 14 are interconnected by an aperture 15 in interior wall 12, which is provided with an upwardly projecting portion 16 and a downwardly projecting portion 17 surrounding the upper and lower ends of aperture 15, respectively. Upward and downward projections 16 and 17 give aperture 15 an elongated axially extending aspect adapted to receive a movable valve stem as hereinafter described.

Aperture 15 has an upper tubular portion 18 with a diameter greater than that of a lower tubular portion 19. Upper and lower tubular portions 18 and 19 are joined in the preferred embodiment by a frusto-conical passage defined by downwardly sloping interior wall section 20. Upper tubular portion 18 terminates in an enlarged portion of aperture 15 which is surrounded by an annular top surface 21 of upward projection 16. Longitudinal channel 22 in the wall of upper tubular portion 18 forms a low pressure passage for gas escaping from the battery.

A valve stem 23 is adapted to fit movably in aperture 15. Stem 23 has a body 24 with a transverse cross-section similar to aperture 15 but slightly smaller in dimension, so that it may move vertically in the aperture without binding. The lower end of body 24 is rounded to promote effective sealing engagement with the sloping interior surface 20 of aperture 15 regardless of variations in the alignment of stem 23. An elongated stem guide 25, of relatively small cross-section with respect to lower tubular portion 19 of aperture 15, projects axially downward from the rounded lower end of body 24, extending past the lower opening of aperture 15. Stem 23 has a top section 26 which is adapted to form a sealing engagement with annular top surface 21 of upward projection 16. In the preferred embodiment, surface 21 is flat while top section 26 has an inverted frusto-conical configuration. This arrangement facilitates sealing despite variations which may occur in the alignment of stem 23.

The vent plug assembly is completed by a cover 27 which closes upper chamber 13 of body 10. Cover 27 has a small hole 28 to permit the escape of gas escaping from the battery through aperture 15. Body 10 is also provided with at least one and preferably two water ports opening at the bottom of upper chamber 13. Also included in the preferred embodiment is an integral gasket 30 having a cross-section thicker at its base than at its outer edge, with a convex upper surface and a concave lower surface, analogous to a Belvue spring.

A submersible battery vent plug embodying the invention functions as follows: When the battery is submerged, water flows through ports 29 and quickly fills upper chamber 13, displacing air which escapes through hole 28 in cover 27. The pressure of the water causes valve stem 23 to move downward in aperture 15, bringing the lower surface of stem top section 26 into sealing engagement with annular top surface 21. Stem 23 is dimensioned so that a relatively low water presure causes the top seal to close before a seal is formed between the rounded lower end of stem body 24 and the sloping interior wall 20. The second seal is formed when increasing water pressure causes stem top 26 to bend slightly, forcing stem 23 still further down in aperture 15 until the lower seal becomes effective. Thus, water which might leak past the primary seal under higher pressure will be prevented by the secondary seal from entering the battery. When the battery emerges from the water, upper chamber 13 quickly drains through ports 29, and air re-enters through hole 28.

The body 10 and cover 27 of the battery vent plug disclosed herein may be formed of a relatively rigid plastic material, such as high impact polypropylene. Valve stem 23 may be made of a relatively resilient material, such as butyl rubber. It may be desired to provide extra stiffness to the central portion of stem top 26 by including thereon an extra thickness in the form of a disc, as illustrated in the drawing.

Although the invention has been described with reference to a specific illustrative embodiment, variations and modifications are possible and may be made by those skilled in this art, without departing from its scope and spirit.

What is claimed is:

1. A submersible battery vent plug comprising
   a tubular body having an externally threaded lower portion adapted to be received in a threaded opening in a battery cover;
   interior wall means within the body dividing the interior thereof into a upper and a lower chamber with an interconnecting axially extending opening, the wall means including a downwardly projecting portion surrounding the lower end of the opening and an upwardly projecting portion having an annular top surface surrounding the upper end of the opening, the interconnecting opening having upper and lower tubular portions with the upper portion having a diameter greater than that of the lower portion and a downwardly sloping interior wall section between the upper and lower portions;
   the body having at least one fluid drain opening connecting the bottom of the upper chamber with the exterior; and
   a valve stem having a resilient upper sealing portion adapted to fit the annular top surface of the interior wall means, a middle portion with a diameter smaller than that of the upper portion of the interconnecting opening, a lower portion with a diameter smaller than that of the lower portion of the opening, and a downwardly convex lower sealing portion between the middle and lower portions, the length of the middle section being less than the axial distance between the annular top surface of the interior wall means and the downwardly sloping interior wall section of the interconnecting aperture, the valve stem being positioned with its middle and lower portions vertically movable within the interconnecting opening and adapted to allow the upper sealing portion to make sealing contact with the annular top surface under the influence of any initial fluid pressure in the upper chamber and to allow the lower sealing portion to make sealing contact with the downwardly sloping wall interior section as the upper sealing portion is deformed by a fluid pressure greater than the initial pressure.

2. The invention of claim 1 and further comprising a top cover for the upper chamber of the body, the cover having a gas vent connecting the upper chamber with the exterior of the body.

3. The invention of claim 1 wherein the interior wall of the upper portion of the interconnecting opening includes at least one longitudinal channel forming a gas vent path around the body of the valve stem.

4. The invention of claim 1 wherein the resilient upper sealing portion of the valve stem is characterized by a downwardly extending frusto-conical surface.

5. The invention of claim 1 and further including an integral outwardly projecting circumferential resilient gasket member having a convex upper surface and a concave lower surface.

* * * * *